United States Patent
Aldridge

[15] 3,650,403
[45] Mar. 21, 1972

[54] TREATMENT OF BIOLOGICAL SLUDGE

[72] Inventor: Anthony Peter Aldridge, Stockport, England

[73] Assignee: Simon-Carves Limited, Cheshire, England

[22] Filed: May 4, 1970

[21] Appl. No.: 34,177

[30] Foreign Application Priority Data

May 22, 1969 Great Britain......................26,151/69

[52] U.S. Cl................................................210/180, 210/67
[51] Int. Cl. ........................................................C02b 1/02
[58] Field of Search......................210/8, 10, 12, 56, 71, 180; 23/174–176

[56] References Cited

UNITED STATES PATENTS

| | | | |
|---|---|---|---|
| 2,075,224 | 3/1937 | Porteous | 210/71 X |
| 2,744,571 | 5/1956 | Mair | 23/274 X |
| 3,155,611 | 11/1964 | Porteous | 210/71 X |
| 3,272,739 | 9/1966 | Earle et al. | 210/56 X |
| 3,272,739 | 9/1966 | Gitchel et al. | 210/12 X |

OTHER PUBLICATIONS

C. Lumb, Heat Treatment as an Aid to Sludge Dewatering-Ten Years' Full-Scale Oeration, Reviews and Abstracts, Sewage and Industrial Wastes, 25, 9, Sept., 1953, page 1,126.

*Primary Examiner*—Reuben Friedman
*Assistant Examiner*—Thomas G. Wyse
*Attorney*—Norris & Bateman

[57] ABSTRACT

A method of treating an aqueous biological slurry comprising the steps of feeding the slurry through an evaporator plant where it is subjected to heat treatment and where a part of its water content is removed by evaporation, filtering the slurry which has passed through the evaporation plant and recycling the aqueous filtrate for further treatment with the slurry in the evaporator plant and an installation for performing same.

2 Claims, 4 Drawing Figures

TREATMENT OF BIOLOGICAL SLUDGE

This invention concerns the treatment of aqueous slurries and particularly, though by no means exclusively, the treatment of sewage sludges.

It is known that sewage sludges may be conditioned by heat treatment to assist their dewatering by filtration. In such a process the filtrate, which is not readily bio-degradable, is normally returned to the inlet of the sewage plant and can hence cause a deterioration of the quality of the final effluent. The filtered solids in the form of a cake are disposed of by any convenient method such as tipping, for example.

It is an object of the invention to provide a convenient and improved method for treatment of sewage sludges.

According to the present invention, a method of treating an aqueous biological slurry comprises the steps of feeding the slurry through an evaporator plant where it is subjected to heat treatment and where a part of its water content is removed by evaporation, filtering the slurry which has passed through the evaporator and recycling the aqueous filtrate for further treatment with the slurry in the evaporator plant.

Preferably the filtered solids are incinerated to provide at least part of the heat requirement of the evaporator plant.

The invention will be further apparent from the following description with reference to the several figures of the accompanying drawings, which show, by way of example only, two forms of installation for the treatment of sewage sludge in accordance with the method of the invention.

Figure 1:
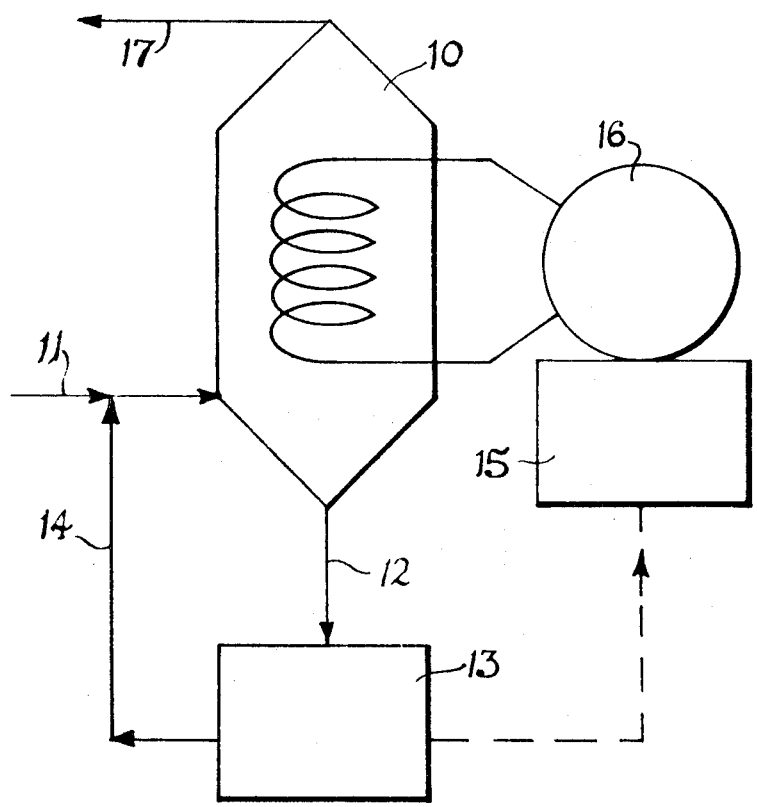
FIG. 1 is a schematic flow diagram of the first form of installation.

Referring first to FIG. 1 of the drawings it will be seen that the installation includes a processing retort or evaporator generally indicated at 10. The sludge to be treated is passed into the evaporator by a line 11 and emerges from the evaporator through a line 12. The temperature in the evaporator should be not less than 350° F. in order to ensure that the biological content of the sludge is suitably conditioned to permit ready filtration.

The sludge emerging from the evaporator 10 is passed by the line 12 to a filter plant generally indicated at 13, which may conveniently be comprised by a rotary vacuum filter, or filter press, for example.

The aqueous filtrate from the filter plant 13 is recycled by a line 14 and mixed with the feed of sludge in line 11 passing into the evaporator 10.

The filtered solids from the filter plant 13 in the form of filter cake are passed to a furnace 15 which fires a waste heat boiler 16 which provides at least a portion of the heat requirement for the evaporator 10. Steam is drawn off from the evaporator 10 through a line 17 and may be condensed by heat exchange with the ingoing sludge in the line 11. The condensate may be returned to the inlet of the sewage plant and will not cause deterioration of the quality of the final effluent because it is readily bio-degradable.

Typical operating conditions for an installation such as described above and fed with sludge at 5 percent suspended solids may be as follows. One pound of sludge at 5 percent suspended solids entering the evaporator 10 through the line 11 will be combined with 0.4 pounds of filtrate from the filter 13 making a total feed to the evaporator 10 of 1.4 pounds. In the evaporator 0.9 pounds of water is evaporated and discharged through line 17 and 0.5 pounds of blowdown at 10 percent suspended solids is discharged to the filter 13. Part or whole of the evaporator 10 operates at 350°-400° F., thus heat conditioning the sludge and making it pumpable and filterable at 10 percent suspended solids. It should be noted, however, that heat treated sludges are pumpable with a solids content of up to as much as 18 percent.

The blowdown passing through the filter 13 produces 0.4 pounds of filtrate which is recycled as has been described, and 0.1 pounds of filter cake at 50 percent solids. The step of recycling the filtrate ensures that those compounds in solution and colloidal suspension are retained in the system and are eventually rejected with the filter cake. Such compounds are not readily bio-degradable and the filtrate should not therefore be discharged to the inlet of the sewage works.

Characteristically the 0.1 pounds of filter cake may be incinerated with 100 percent excess air to produce approximately 0.75 pounds of waste gas at 1,500° F. Thus the waste heat recovery is of the order of 200-225 B.t.u. per pound of original sludge intake and thus comprises an important heat source for the evaporator 10. Obviously additional fuel is required to fire the boiler 15 to provide sufficient heat for the evaporator 10 to operate as here described.

It will be apparent, however, that certain sludges may have a sufficiently high calorific value to enable the installation described above to operate with the evaporation level mentioned without additional fuel. More usually, however, in order to evaporate sufficient of the liquor content of the sludge with the quantity of heat available from the incineration stage, a multiple effect evaporation plant needs to be employed.

Figure 2:
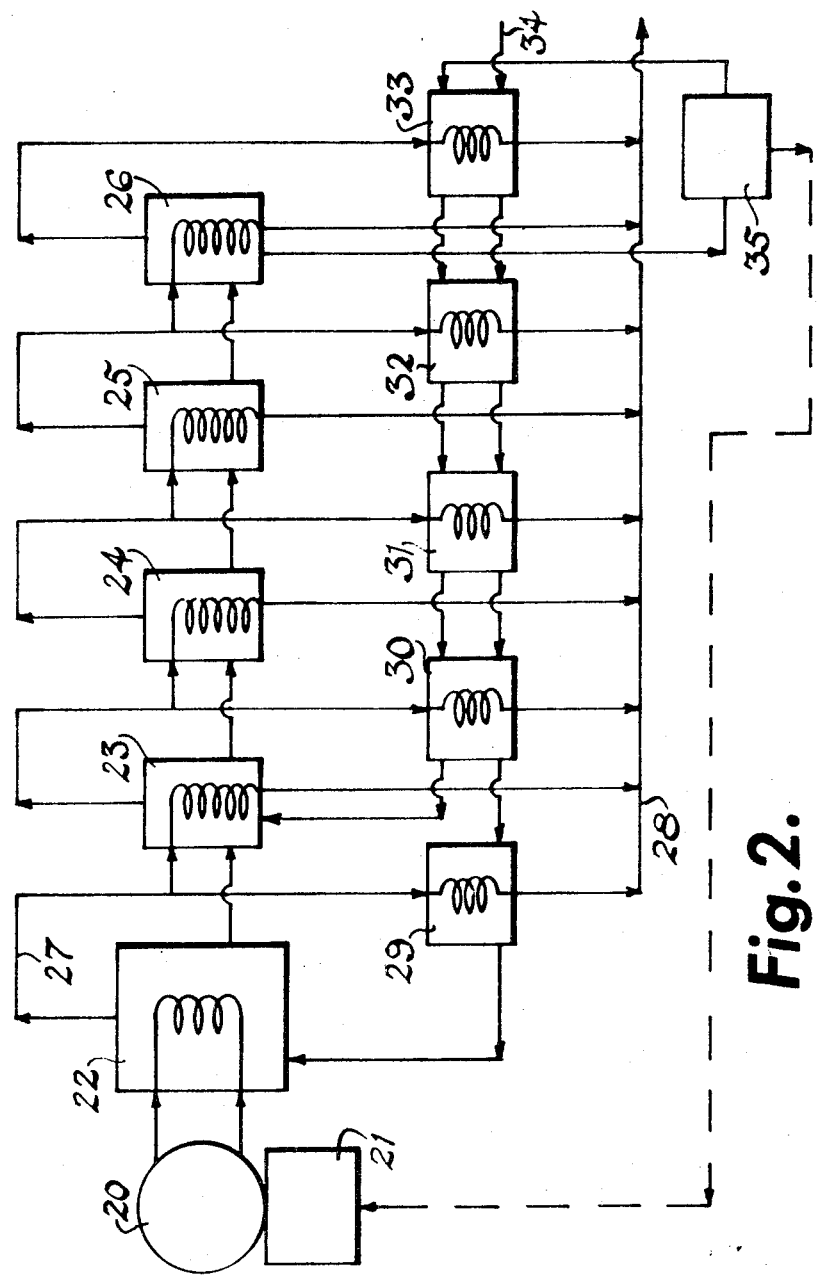
FIG. 2 is a schematic flow diagram of the second form of installation.

Referring now to FIG. 2 of the drawings it will be seen that a typical installation having a multieffect evaporator plant comprises as before, a waste heat boiler 20 fired by a furnace 21. The evaporator plant comprises a processing retort 22 which also forms the first effect of the evaporating plant, and four further evaporator vessels 23, 24, 25 and 26 forming the second, third, fourth and fifth effects of the multieffect evaporator plant, respectively. The processing retort 22 or first effect vessel is heated by steam from the waste heat boiler 20. Steam produced in the processing retort 22 is discharged through a line 27 which divides to supply the steam after it has been condensed to a line 28 via a vapor heat exchanger 29 and the second effect vessel 23, respectively. Likewise, the steam produced in each of the vessels 23 to 25 inclusive is supplied to the line 28 via heat exchangers 30, 31 and 32 and the vessels 24, 25 and 26, respectively. Steam produced in the vessel 26 is supplied to the line 28 via a final vapor heat exchange unit 33. It will be understood that each of the vessels 23 to 26 inclusive is heated by a portion of the steam produced by the preceding vessel in the multieffect evaporator plant, and that each of the evaporator vessels operates at successively lower temperatures and pressures. The incoming sludge enters the apparatus through a line 34 and passes to the processing retort 22 via all of the vapor heat exchange units 29 to 33 inclusive. The sludge is passed successively through the vessels 22 to 26 inclusive and the blowdown from the vessel 26 is passed through a filter 35, the aqueous filtrate being passed through the vapor heat exchangers 30 to 33 inclusive before entering the second effect vessel 23 there to mix with the sludge which has been pretreated in the processing retort 22. The filter cake from the filter 35 is incinerated in the furnace 21 to fire the waste heat boiler 20.

The condensate from the line 28 may be returned to the inlet of a sewage works with which the installation is associated as with the installation described with reference to FIG. 1.

Typical operating conditions may be similar to those described above with reference to the installation of FIG. 1, but in this example the waste heat along produced will be sufficient to cause the required evaporation without additional fuel due to the multieffect operation.

Figure 3:
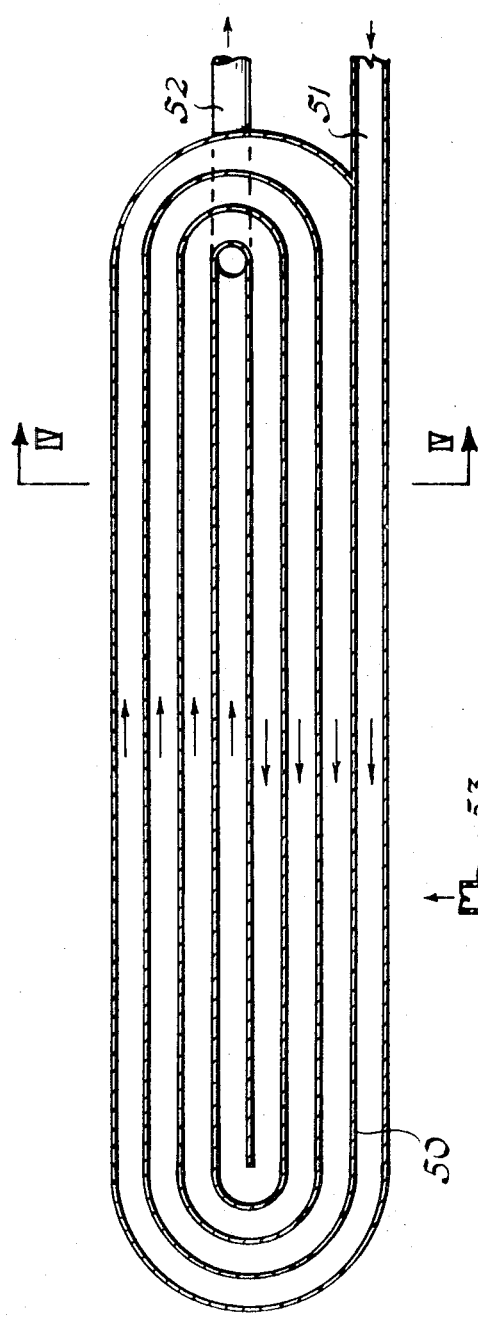
FIG. 3 is a horizontal cross section through the processing retort of the apparatus of both FIGS. 1 and 2.
Figure 4:
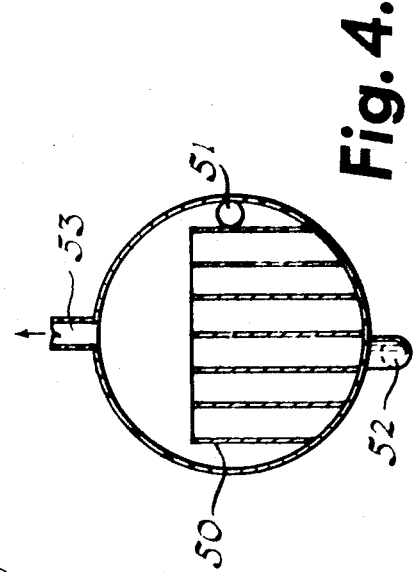
FIG. 4 is a vertical cross section through the processing retort on the line IV-IV of FIG. 3.

To ensure that the sludge is properly heat conditioned in the processing retort or first effect vessel 22, such vessel is preferably designed as a horizontal cylindrical pressure vessel with rounded end caps as shown in FIGS. 3 and 4. Within the vessel there is a spiral partition 50 to give an extended flow path for the sludge which enters through a line 51 at the periphery of the vessel and is discharged through a line 52 at the far end of the spiral path. The partition 50 extends about half way up the height of the vessel leaving a free space at the top of the vessel allowing steam to escape through the line 53. The partition 50 is preferably comprised by heat exchange plates which are heated by steam from the waste heat boiler. The sludge is pumped into the vessel at a controlled rate to maintain a retention time in the retort of 15 minutes to 1 hour depending upon the heat conditioning requirements for a particular sludge. The sludge moving around the spiral path in the vessel is heat conditioned and partially evaporated, the steam bubbles produced maintaining a clean heat exchanger surface. At the end of the spiral the sludge is pumped into the second effect vessel where it is joined by the filtrate. As far as possible the filtrate is kept out of the processing retort to avoid secondary breakdown of the organics in solution which would impair the condensate quality. Over a range of inputs, the correct retention time in the processing retort can be maintained by varying the height of the sludge within the vessel.

The processing retort described with reference to FIGS. 3 and 4 is also suitable for use as the evaporator vessel in the installation of FIG. 1.

It will be appreciated that it is not intended to limit the invention to the above examples only, many variations, such as might readily occur to one skilled in the art, being possible without departing from the scope thereof.

Thus, for example, the evaporator plant may comprise any number of effects. Normally the number of effects chosen for a particular installation would be designed to ensure, having regard to the nature of the biological slurry to be treated, that the incineration of the solids obtained from the blowdown from the evaporator plant would by itself provide sufficient heat to operate the evaporator plant.

The evaporator plant itself need not be precisely as described above but may be of any known kind.

The slurry to be treated need not be passed through the evaporator plant from the hottest vessel to the coolest, but could be passed through the plant in the reverse direction.

What is claimed is:

1. An installation for treating an aqueous biological slurry comprising a series of evaporator vessels so connected that slurry may be fed through them in succession, means for heating the slurry in a first vessel at one end of the series, a plurality of heat exchange devices each associated with an evaporator vessel, means for directing steam from each evaporator vessel except that at the other end of the series into the next succeeding evaporator vessel and means for directing steam from each evaporator vessel into the associated heat exchanger, means for feeding incoming slurry through all of said heat exchangers and then into the first evaporator vessel, means for filtering the slurry after passage through the last evaporator vessel of the series, and means for directing the aqueous filtrate to pass through said heat exchangers and then into one of said evaporator vessels.

2. The installation defined in claim 1, wherein means is provided for incinerating the filtered solids and supplying the resultant heat to said first evaporator vessel.

* * * * *